(No Model.)

P. LOCHMANN.
APPARATUS FOR TRANSPORTING AND PRESERVING LIQUIDS.

No. 601,877. Patented Apr. 5, 1898.

WITNESSES:
Geo H Jackel
R H Pelouze

INVENTOR
Paul Lochmann
BY
Jaque Jaegener
ATTORNEYS.

UNITED STATES PATENT OFFICE.

PAUL LOCHMANN, OF LEIPSIC, GERMANY.

APPARATUS FOR TRANSPORTING AND PRESERVING LIQUIDS.

SPECIFICATION forming part of Letters Patent No. 601,877, dated April 5, 1898.

Application filed August 14, 1896. Serial No. 602,728. (No model.)

*To all whom it may concern:*

Be it known that I, PAUL LOCHMANN, a subject of the King of Saxony, residing at Leipsic, Saxony, German Empire, have made a new and useful Improvement in Apparatus for Transporting and Preserving Liquids, of which the following is a full and clear specification.

This invention relates to an apparatus for transporting and preserving liquids of all kinds; and the object of the same is to enable the ready emptying of the liquid-containing vessel without subjecting the liquid to the direct pressure or influence of atmospheric air and to enable, with little trouble, small quantities of beer, wine, or other liquid contained in the vessel to be discharged without injuring the quality of the remaining liquid to the slightest degree, the liquid remaining in the vessel being kept in its original good condition for a longer period of time than heretofore, and until the same is completely used up.

Figure 1:
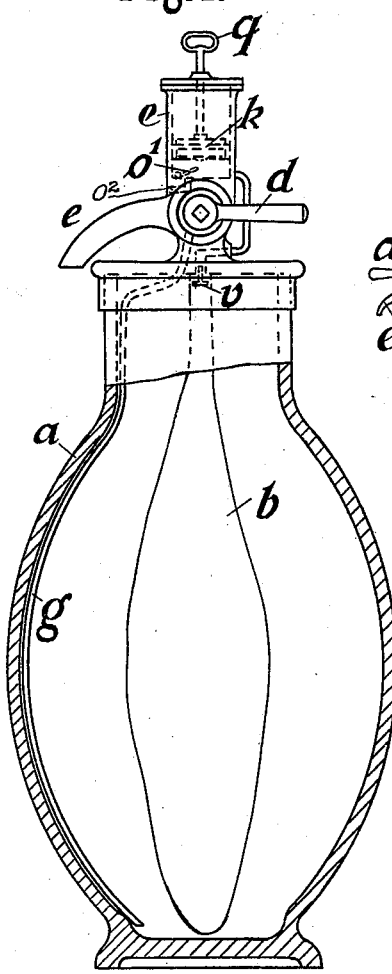
Figure 2:
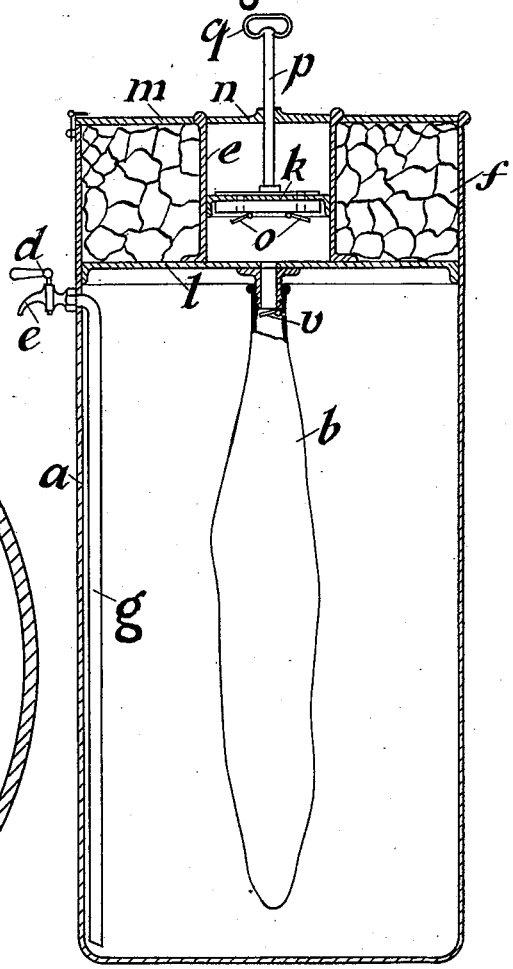

In the accompanying drawings, Figure 1 is a vertical sectional view of a liquid-containing vessel in the form of a bottle, the same being provided at its interior with an elastic expeller and at its exterior with a pump for inflating the expeller; and Fig. 2 is a vertical longitudinal section of a cylindrical liquid-containing vessel provided with similar parts to those shown in Fig. 1, but equipped with a cooling-chamber surrounding the pump.

The main characteristic of my improvement resides in a liquid-containing vessel which is provided with an elastic expeller that may consist of an elastic bulb or membrane arranged within the vessel. Said expeller when exposed to the pressure of air, gas, or liquid is expanded or inflated, so as to displace the liquid in the vessel and force out part or all of the same when the tap is opened. At all times while the liquid is being discharged and also while it is not being discharged the atmospheric air cannot enter into the liquid-containing vessel, and consequently the durability of the liquid is assured. The principal cause of beer, wine, or other liquids becoming stale or thick is, as a rule, ascribed to the fact that atmospheric air gets into the liquid in the vessel.

In Fig. 1 the liquid-containing vessel $a$ is shown in the form of a bottle, while in Fig. 2 it is shown in cylindrical form; but the vessel may be shaped in any other desired manner.

In the vessel $a$ is contained an elastic expeller $b$ in the form of a bulb or balloon, said elastic expeller being closed to prevent exit of the compressed air contained in the same by means of a clack-valve $d$. Now if air, carbonic acid, any other gas, or any suitable liquid is pumped into the expeller $b$ or against the membrane the liquid contained in the vessel is forced out through the faucet $e$ when the lever $g$ of the cock or tap is opened, no atmospheric air being able to enter into the vessel.

For inflating the expeller $b$ an air-pump $c$ is provided, as shown; but any other suitable means for inflating the expeller may be provided, and, according to the requirements, gas, air, or water may be admitted into the expeller.

In order that all of the liquid contained in the vessel may be expelled, the faucet $e$ is provided with a downwardly-extending tube or leg $g$, that terminates near the bottom of the vessel. The piston $k$ in the air-pump may be either directly supplied with clack-valves $o$ (see Fig. 2) or may be connected with a valve $o'$ in the bottom of the cylinder of the pump $g$, which leads by passage $o^2$ to the outer air. (See dotted lines, Fig. 1.) For operating the piston $k$ the same is provided with a piston-rod $p$, carrying a handle or grip $q$.

As shown in Fig. 2, the vessel may be provided with an ice-chamber $f$, that is arranged between the double walls $l$ and $m$, which close the top of the vessel, said chamber encircling the air-pump $c$, or said chamber can be arranged in any other desired manner so as to serve at the same time for cooling both the liquid in the vessel and the air-pump, so that the air as well as the liquid is cooled before it is forced into the expeller, thus cooling the liquid from the inside by reason of the cool body of air contained in the expeller. The top wall of the circumferential cooling-chamber $f$ is closed by means of the annular lid $m$, forming the top wall of the vessel, while the air-pump is closed by means of a circular lid $n$. The air-pump must be operated to a greater or less extent, depending upon the quantity of liquid which is to be forced out of the vessel by the expansion of the expeller. The pump and the discharge-cock may be both mounted on the closure of the vessel, as shown in Fig. 1, or directly attached to the vessel, or they may be separated from each other by the closure $l$, as shown in Fig. 2. The elastic expeller, or, instead thereof, the elastic membrane or diaphragm, may be arranged in any suitable or desired manner for the purpose of acting when subjected to pressure upon the liquid contained in the vessel.

Having thus described my invention, I claim as new and desire to secure by Letters Patent—

In an apparatus for transporting and preserving liquids, the combination with a vessel, of an elastic expeller within the vessel, a pump for inflating the expeller and forcing the contained liquid in the vessel through the outlet thereof, and a cooling-chamber surrounding the pump, substantially as set forth.

In testimony whereof I have signed my name to this specification in the presence of two subscribing witnesses.

PAUL LOCHMANN.

Witnesses:
OTTO ROESLER,
RUDOLPH FRICKE.